Feb. 18, 1941.  J. A. VAN DEN AKKER  2,232,086
MECHANICAL INTEGRATOR
Filed May 20, 1933   3 Sheets-Sheet 1
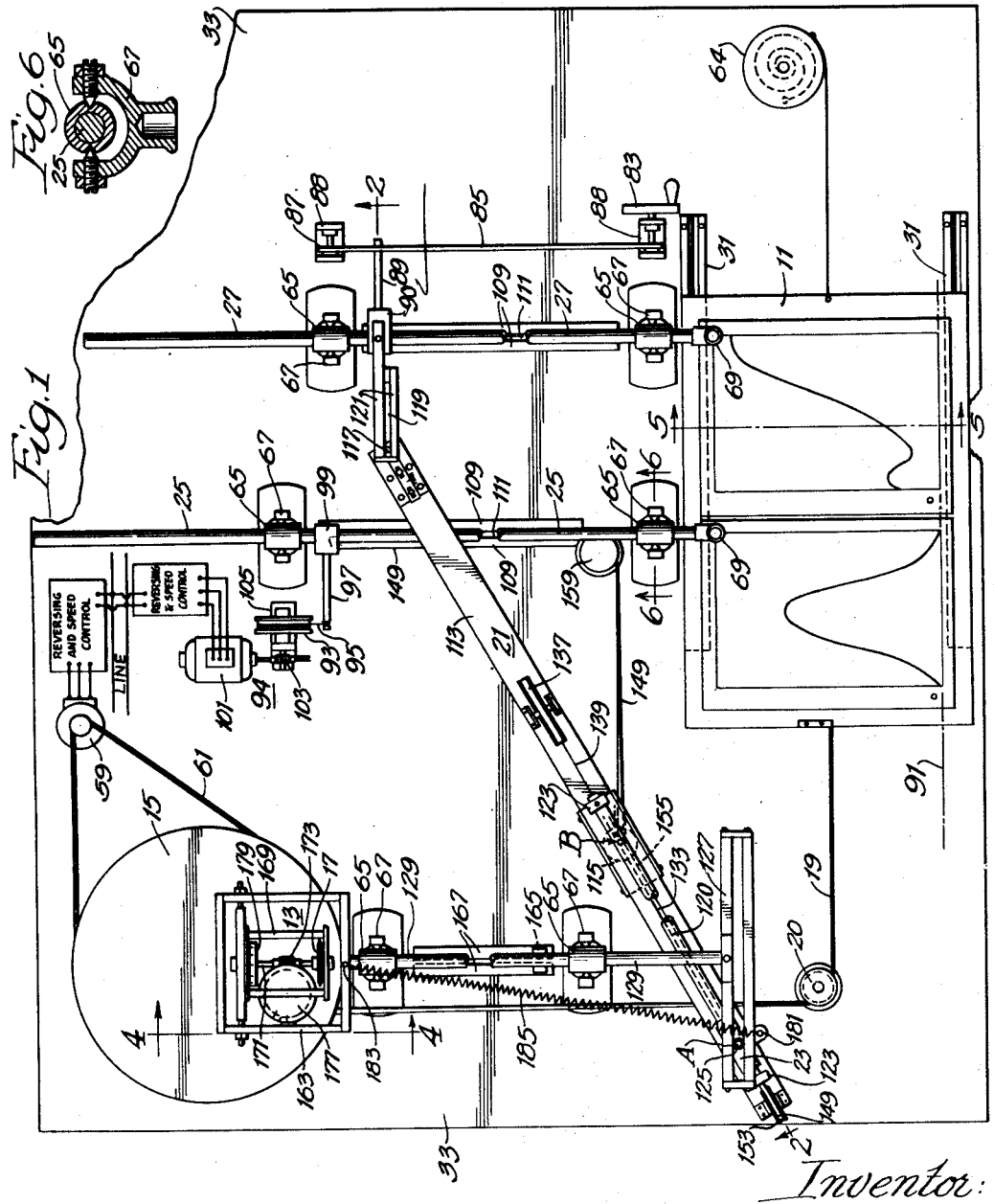
Inventor:
Johannes A. Van den Akker,
By Fisher, Clapp, Soans & Pond
Attorneys.

Feb. 18, 1941. J. A. VAN DEN AKKER 2,232,086
MECHANICAL INTEGRATOR
Filed May 20, 1938 3 Sheets-Sheet 2
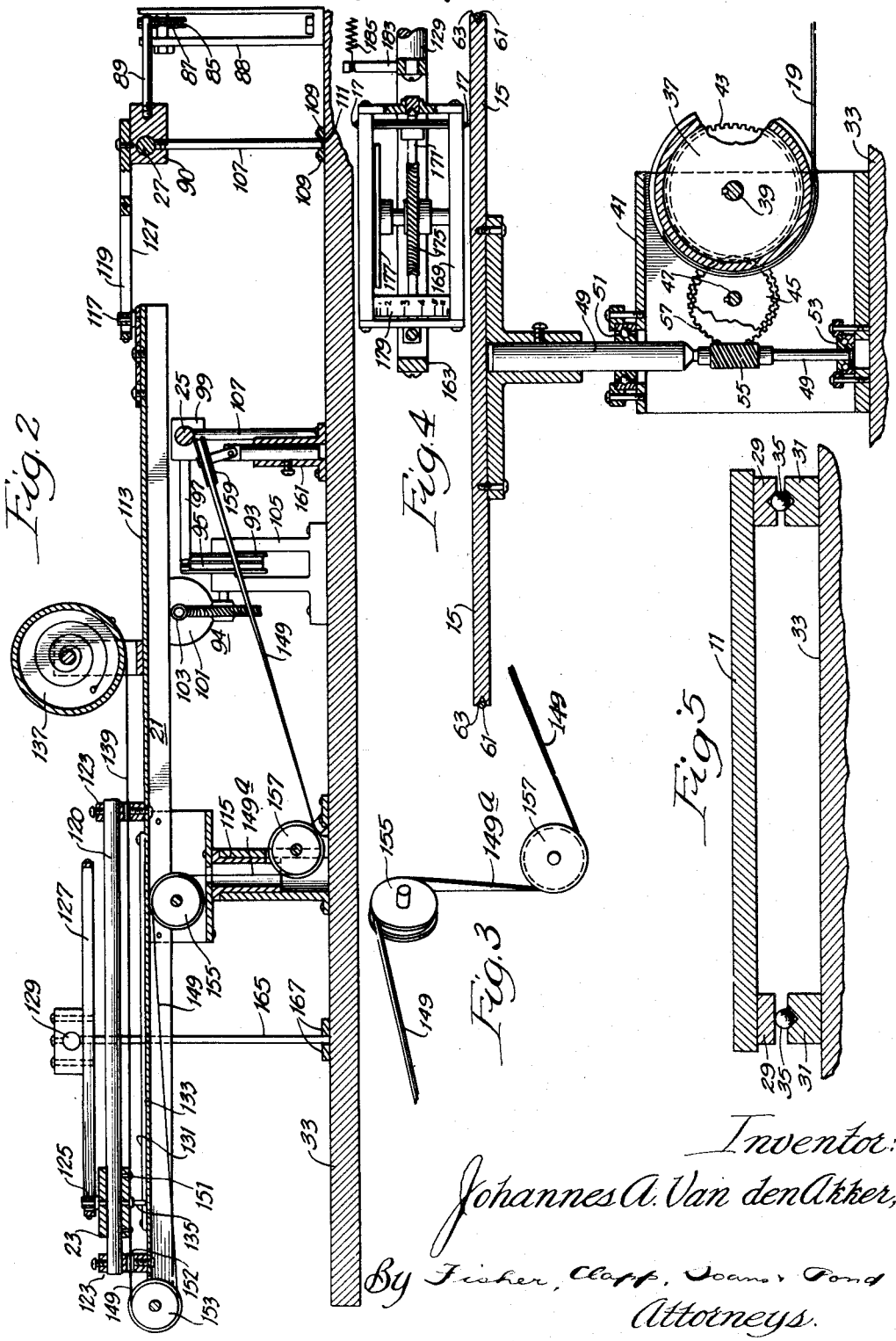
Inventor:
Johannes A. Van den Akker,
By Fisher, Clapp, Soans, Pond
Attorneys.

Feb. 18, 1941. J. A. VAN DEN AKKER 2,232,086
MECHANICAL INTEGRATOR
Filed May 20, 1938  3 Sheets-Sheet 3
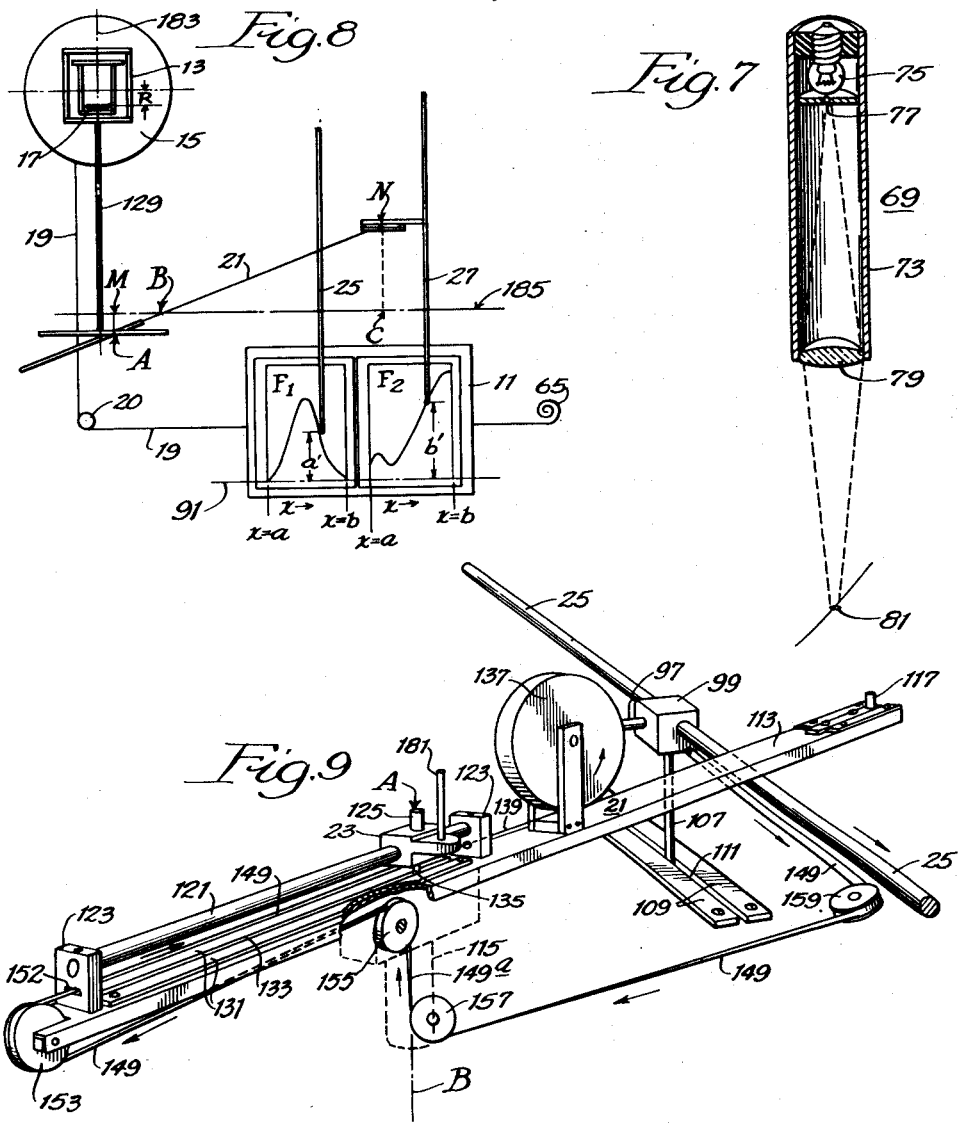
Inventor:
Johannes A. Van den Akker,
By Fisher, Clapp, Soans & Pond
Attorneys.

Patented Feb. 18, 1941

2,232,086

UNITED STATES PATENT OFFICE 2,232,086

MECHANICAL INTEGRATOR

Johannes A. Van den Akker, Appleton, Wis., assignor to The Institute of Paper Chemistry, Appleton, Wis., a corporation of Wisconsin Application May 20, 1938, Serial No. 209,011

10 Claims. (Cl. 235—61)

My invention relates generally to mechanical integrating machines and has particular reference to machines for integrating integrals of the type $\int F_1 F_2 dx$ where $F_1$ and $F_2$ are any finite functions of $x$.

I am aware that integrating machines have been developed which are capable of integrating integrals of this type. The object of the present invention, however, is to provide an improved machine of this type which shall be much simpler in construction, much more accurate, much easier to manufacture, calibrate, and keep in repair, and much less costly than the prior machines. Other objects of my invention are to provide certain improved mechanical movements and certain improved optical apparatus suitable for use in conjunction with integrating machines or other apparatus requiring similar types of movement, and especially suitable for use in conjunction with the particular integrating machine of my invention. These and other objects and advantages of my invention will be made more apparent by reference to the following description of a preferred embodiment thereof taken in connection with the drawings illustrating the features of this embodiment. In the drawings—

Figure 1 is a plan view illustrating a mechanical integrating machine embodying the features of my invention;

Figure 2 is a sectional view on the general line 2—2 of Figure 1;

Figure 3 is a fragmentary view illustrating one of the mechanical features of the integrating machine of my invention;

Figure 4 is a sectional view on the general line 4—4 of Figure 1;

Figure 5 is a sectional view on the general line 5—5 of Figure 1;

Figure 6 is a sectional view on the general line 6—6 of Figure 1;

Figure 7 is an enlarged sectional view illustrating the features of one of the optical pointers used in conjunction with the integrating machine illustrated in the other figures of the drawings;

Figure 8 is a diagrammatic view which will be used in explaining the operation of the integrating machine of my invention; and Figure 9 is a fragmentary perspective view illustrating certain of the mechanical movements and other apparatus constituting a part of the integrating machine of my invention.

It is contemplated that the integrating machine of the present invention shall be used in connection with plots or charts of the curves of the functions which it is desired to integrate, and the apparatus includes, therefore, a flat table 11 for supporting these curve charts in a horizontal plane in such manner that they may be moved with rectilinear motion in that plane. The machine also includes an integrating mechanism 13 of the conventional single wheel type which is adapted to be actuated by a circular plate or disc 15 the rotative movement of which is proportional to the rectilinear movement of the support table 11 for the curve charts. As will be pointed out hereinafter, this rotative movement of the disc 15 which actuates the drive wheel 17 of the integrating mechanism 13 is accomplished by a direct mechanical connection between the disc 15 and the table support 11, which connection in the disclosed embodiment of the invention includes a flexible steel tape 19 trained over a suitable guide pulley 20.

The principal operating member of the apparatus comprises a beam 21 pivotally supported intermediate its ends for movement about a vertical axis B extending perpendicular to the longitudinal axis of the beam. The beam 21 is mechanically connected to the integrating mechanism 13 by means which includes a slider member 23 supported so as to be movable longitudinally along the beam 21.

Movement of the slider 23 is controlled by a follower arm 25 which is moved longitudinally to follow one of the curves being integrated as the chart of that curve is traversed from one extreme position to the other during the integrating operation. In other words, a mechanical means is provided so that the point of action of the slidable member 23 (the point A of Figures 1 and 8) is maintained at a distance from the axis of rotation B of the beam 21 equal to the ordinate of the left hand curve ($a'$ Figure 8) at all times during the operation of the machine.

The right hand end of the beam 21 is mechanically connected to a second follower rod 27 which is likewise longitudinally movable in order that it may follow the right hand curve chart during the integrating operation, thereby causing the distance CN of Figure 8 to be equal at all times to the ordinate $b'$ of the right hand curve and the distance MA to be proportional at all times to the ordinate $b'$ of the right hand curve.

The various mechanical arrangements whereby the point A is maintained in the desired relationship relative to the axis of rotation B of the beam 21 and whereby the rotative movement of the end of the beam is caused to take place proportionally to the ordinate of the right hand curve, and the means whereby movement of the beam 21 and the sliding member 23 are transmitted to the integrating mechanism 13 constitute important features of the invention. Likewise, the table support 11 for the curve charts and the means of transmitting rectilinear movement of this support to the integrating disc 15 are important parts of the invention.

Considering the details of the machine: The table 11 preferably comprises a flat metallic plate and is supported for rectilinear movement in a horizontal plane by means of two guides 29 (Figure 5) affixed to the bottom thereof and arranged to cooperate with similar guides 31 affixed to the stationary bed plate or frame 33 upon which the entire integrating machine is mounted. The right hand pair of these guides, as illustrated in Figure 5, is provided with V-shaped notches within which are positioned ball bearings 35. To prevent wedging of the table 11 during movement, only one of the other pair of guide members is provided with a V-shaped notch, and the cooperating guide surface is flat, as is also illustrated in Figure 5.

The flexible metallic tape 19 used for connecting the table 11 to the drive disc 15 for the wheel 17 of the integrating mechanism 13 is preferably of steel or bronze. The tape 19 after passing over the guide pulley 20 engages a take-up pulley 37 (Figure 4) to which the end of the tape 19 is fastened. The pulley 37 is journaled upon a suitable horizontal shaft 29 the ends of which shaft are supported on the side members of a box-shaped frame 41. A gear wheel 43 is keyed to the take-up pulley 37 and engages a second gear 45 which is keyed to a second horizontal shaft 47, likewise suported on the box-frame 41.

The disc 15 is supported upon the box-frame 41 for movement about a vertical axis by means of a vertical shaft 49 and two bearings 51 and 53, one of which is preferably of the thrust type. A worm gear 55 is provided on the vertical shaft 49 for engaging a third gear 57 which is keyed to the second horizontal shaft 47. The horizontal shafts 39 and 47 are preferably so arranged that the gears 43 and 45 extending intermediate the take-up pulley 37 for the tape 19 and the worm drive 55 for the integrating disc 15 may be removed and replaced with other gears so as to vary the ratio between longitudinal movement of the tape and rotative movement of the integrating disc. This arrangement whereby the ratio between longitudinal movement of the tape and rotative movement of the integrating disc may be varied is an important feature of the invention. In many integrating devices the integrating wheel slides nearly as far as it rotates, and this condition is not conducive to good precision. If the ratio is variable, however, the reduction ratio may be selected, which is such that the integrating wheel will roll much farther than it slides, that is, the motion of the integrating wheel relative to the disc 15 can be made equal to a small angle with the tangent even for "steep" curves, with accompanying increase in accuracy.

The integrating disc 15 may be of metal, Bakelite, or similar non-warping material. It is accurately machined flat on its upper surface and is supported upon, and keyed to, the vertical shaft 49 in such manner that its upper surface shall lie in a plane exactly perpendicular to the axis of rotation of its vertical supporting shaft 49. To prevent wearing of this surface a replaceable disc of rag paper, animal parchment or the like may be applied thereto.

During the operation of the integrating machine, the disc 15 constitutes the main driving element for the automatically controlled moving parts of the integrating machine. The disc 15 is preferably rotated at a predetermined uniform speed by means such as a reversible, adjustable speed motor 59 which in the structure illustrated in the drawings is connected to the disc 15 by a belt 61 adapted to engage a groove 63 provided in the edge of the disc, although it is not necessary that the speed of rotation of the disc 15 be accurately uniform. Rotative movement of the disc is transmitted to the take-up pulley 37 for the tape 19 by the gears 55, 57, 45, and 43, and thereby produces rectilinear movement of the curve support table 11 at a rate directly proportional to the rate of rotation of the disc. A suitable spiral spring mechanism 64 serves to maintain the tape 19 under tension at all times and thereby acts to take up all slack in the mechanical connection between the disc 15 and the table 11.

The follower rods 25 and 27 are cylindrical and are supported for rectilinear movement along their longitudinal axes by means of suitable sleeve bearings 65, which bearings in turn are supported upon the bed plate 33 of the machine by means which includes angularly adjustable brackets 67. Each of the rods 25 and 27 is provided at its outer end with an optical pointer mechanism 69 illustrated particularly in Figure 7. This mechanism includes an opaque tube 73 about one inch or so in diameter having a source of light, such as the miniature lamp 75, located at the upper end thereof. An opaque diaphragm having a small circular aperture 77 formed therein is positioned adjacent this source of light, and a lens 79 located at the lower end of the tube 73 forms with this aperture a small circular spot of light 81 (Figure 7) approximately .05 to .15 inch in diameter which is adapted to be directed upon the upper surface of one of the curve charts supported on the table 11. I have found that with this arrangement it is a very simple matter for the operators of the instrument to move both follower rods as the curve charts are traversed from one extreme position to the other so as to keep each spot of light centrally on the curve which it is desired to follow, extremely small deviations from center being very clearly noticeable. Further, the device is free from parallax error; it eliminates the eye strain occasioned by the following of a curve with a material pointer of the usual type; and unlike a metal pointer will not run afoul of the curves, in the event that the paper on which they are plotted should buckle.

Longitudinal movement of the right hand follower rod 27 is accomplished by means of a hand wheel mechanism 83, a sprocket chain 85, and a toothed wheel or other chain support 87. The hand wheel mechanism 83 and the toothed wheel 87 are supported upon the main frame 33 by suitable U-shaped brackets 88 which are affixed to the bed plate 33. The chain 85 is mechanically connected to the follower rod 27 by a pin 89 which engages a block member 90 rigidly affixed to the follower rod.

As will hereinafter appear, the left hand follower rod 25 of the apparatus shown in the drawings is biased in the direction of the base line 91 of the curves supported upon the table 11 and is moved to intermediate positions when following a curve during the integrating operation by a motor driven mechanism 94. This mechanism 94 includes a take-up pulley 93 which is adapted to receive a flexible tape or wire 95, the free end of which is attached to a rod 97 supported by a block 99 keyed to the follower rod 25. The motor 101 of the mechanism 94 is preferably of the reversible, adjustable speed type and is mechanically connected to the take-up pulley 93 by a worm drive 103. The motor drive mechanism 94 for the follower rod 25 is supported upon the bed plate 33 by a suitable bracket 105 similarly to the hand drive mechanism for the other follower rod 27.

To prevent axial rotative movement of the follower rods 25 and 27 during the operation of the apparatus, each of the blocks 90 and 99 which serve to connect the respective drive means to the follower rods is provided with a downwardly extending pin 107 adapted to slidably engage the sides of two strips 109 of metal rigidly affixed to the bed plate 33 of the mechanism so as to define a rectilinear slot 111 therebetween. The clearances between the opposed surfaces of these strip members 109 and the downwardly extending pins 107 are kept as small as possible, as is consistent with the smooth operation of the follower rods, and the relatively long leverage given by the guide pins 107 serves to positively eliminate any rotation of the follower rods about their longitudinal axes during the integrating operation.

While the right hand follower rod 27 is hand driven and the left hand follower rod 25 is motor driven, it will be understood that both may be hand operated or both may be motor driven, or the driving arrangements may be interchanged.

In the embodiment of my invention I have motorized the left hand follower rod 25 merely for the reason that, in the most typical application to which I have put my invention, the curves representing the function $F_1$ are quite steep and it is possible to follow these curves more accurately with a motorized rod than with a hand-driven rod. It is necessary merely that some means be available whereby the follower members may be moved to follow the curves being integrated.

The beam 21 which constitutes the primary actuating member in the mechanism for moving the integrating mechanism 13 relative to the disc 15 during the integrating operation is illustrated particularly in Figures 1, 2, and 9. As shown in those figures, the beam 21 includes a rigid, channel shaped steel bar 113 supported for rotative movement about a vertical axis located intermediate its ends by means of a cylindrical thrust bearing 115. A roller 117 is supported upon the right hand end of the beam 21 in such manner that the axis thereof is perpendicular to the plane of rotation of that member. The roller 117 is adapted to fit within a slot 119 formed between a pair of spaced guide members 120 rigidly affixed to the block member 90 which in turn is rigidly affixed to the right hand follower rod 27. The support for this roller 117 is preferably arranged so as to permit slight adjustment of the position of the roller lengthwise of the beam 21 to facilitate the calibrating of the machine. The guides 120 and the roller 117 constitute the means used for producing rotation of the beam 21 and hence movement of the integrating apparatus 13 in response to movement of the right hand follower rod 27 during the integrating operation.

A cylindrical rod 121 is supported at the other end of the beam 21 by means of a pair of uprights 123 so located that the longitudinal axis of the rod 121 will lie in a plane coincident with the axis of rotation of the beam and intersecting the axis of the roller 117. The rod 121 serves as a guide and support for the slider 23. The slider 23 is provided with a vertical roller 125 for engaging a forked guide 127 affixed to one end of a cylindrical slider rod 129 which serves as the support and operating means for the integrating mechanism proper. The slider rod 129 is supported for longitudinal movement by two bearings 65 similarly to the follower rods 25 and 27. To prevent rotation of the slider 23 during the operation of the machine, a pair of strap members 131 are bolted to the beam 21 beneath the guide rod 121 so as to define a guide slot 133 which is engaged by a downwardly extending pin 135 affixed to the slider. The slider 23 is biased in the direction of the right hand end (Figure 2) of the beam 21 by a spring pulley 137 which is operatively connected to the slider 23 by a flexible wire or tape 139.

The slider 23 is caused to move in response to movement of the left hand follower rod 25 through the agency of a metallic tape 149, preferably of steel, having a coefficient of thermal expansion very similar to that of the general structure. One end of the tape 149 is rigidly affixed to the slider 23 at 151 (Figure 2). The tape 149 then passes through a suitable opening 152 in the left hand support 123 over a pulley 153 supported on the beam 21 and from there passes over a second pulley 155 supported on the beam adjacent the axis of rotation thereof in such manner that the tape supporting surface of the pulley 155 is at all times tangent to the axis of rotation of the beam 21. The tape 149 next passes over a third pulley 157 supported on the bed plate 33 adjacent the bearing support 115 for the beam 21. The tape supporting surface of the pulley 157 is likewise tangential to the axis of rotation of the beam 21. From the pulley 157 the tape passes to a fourth pulley 159 supported on a bracket 161 attached to the bed plate 33 and thence to the block 99 where it is rigidly attached and through which block it is connected to the follower rod 25. The spring pulley 137 thus acts through the tape 149 to bias the follower rod 25 in the direction of the base line 91.

The spring mechanism 137 maintains the tape 149 under tension at all times and thereby not only automatically takes up all slack in this portion of the apparatus, but assures that the slider 23 shall be moved in exact response to movement of the follower rod 25. By virtue of the positioning of the two intermediate pulleys 155 and 157, the vertical portion 149ª of the tape 149 is at all times coincident with the axis of rotation of the beam 21, and tests have shown that the slight angular twist produced in this portion of the tape by rotation of the beam 21 results in such infinitesimally small changes in the length of the tape 149 as to introduce no appreciable error in the mechanism.

The integrator mechanism 13 is supported by a rectangularly shaped frame 163 one end of which is rigidly affixed to the slider rod 129, which rod, as described previously, is supported for rectilinear axial movement similarly to the follower rods 25 and 27 by a pair of bearings 65. The slider rod 129, like the follower rods 25 and 27, is provided with a downwardly extending pin 165 adapted to slide between a pair of flat guide members 167 bolted to the bed plate 33 of the mechanism, this pin 165 serving to prevent rotation of the rod about its axis.

The integrating mechanism 13, as stated above, is preferably of the standard single wheel type and includes generally a rectangularly shaped frame 169 pivotally supported at one end upon the main frame 163. The integrator wheel 17 has a smooth surfaced, relatively narrow edge for contacting the surface of the disc 15 and is moved along a diameter of the disc 15 during the operation of the machine. The integrator wheel 17 is supported upon the U frame 169 by a rotatable shaft 171 extending parallel to the axis of the slider rod 129 and at right angles to the axis of the support for the frame 169. The shaft 171 is provided with a worm 172 which engages a gear 175 keyed to a vertical shaft which carries the main counter wheel 177. A secondary counter wheel 179 for measuring fractions of a revolution is supported on the shaft 171, and indicia for cooperating with the fractional or secondary counter wheel and for the main counter wheel are provided.

The slider member 23 is provided with an upwardly extending pin 181 which is adapted to be connected to a similar pin 183 rigidly attached to the frame 163 of the integrating mechanism 13 by a spiral spring 185 normally under substantial tension. This spring 185 constitutes an important part of the present invention for the reason that it simultaneously eliminates any play between the slider 23, the beam 21, and the integrating mechanism 13. This arrangement, in combination with the spring mechanisms 137 and 64 which respectively eliminate play in the mechanical connection between the follower rod 25 and the slider 23 and in the mechanical connection between the table 11 and the integrating disc 15, results in almost complete elimination of any error due to looseness of the parts during the operation of the machine. The only connection in the entire device which does not include a spring means for taking up play is the slidable connection between the beam 21 and the follower rod 27, and due to the very slight forces and large leverage which are encountered at this point it is possible to make the clearances sufficiently small that any error due to looseness of that connection will be negligible.

The operation of the machine of my invention is carried out in the following manner: Plots or charts of the functions which it is desired to integrate are mounted on the table 11 in such manner that the base line of the curves coincides with the zero axis 91 of the machine which is permanently marked on the table. The charts are drawn to the same scale and corresponding portions thereof are spaced apart a distance equal to the distance between the follower rods 25 and 27. The table is then moved to the extreme right hand position, i. e. opposite to the position shown in Figure 1.

When the table is in this position and one or the other of the follower rods 25 and 27 is moved downwardly by operation of the hand wheel mechanism 83 or the motor mechanism 94 so that the corresponding spot of light 81 produced by the optical pointer mechanisms 69 coincides with the zero or base line 91 of the two curves, the integrator wheel 17 should contact the exact center of the disc 15. This arrangement provides a convenient means for checking the accuracy of the location of the curves.

During the actual integrating operations the motor 59 which drives the disc 15 is operated so as to traverse the table 11 from the right hand position thereof to the left hand position thereof. During this movement the spots of light 81 produced by the optical pointer mechanisms 69 are caused to follow the curves plotted on the two curve charts by operation of the hand wheel 83 and the motor mechanism 94. Most satisfactory results can be obtained by two operators, one of whom operates the motor driven actuating mechanism for one of the follower rods, while the other operates the hand actuating mechanism of the other follower rod. The particular machine illustrated in the drawings, is provided with one motor driven follower rod and one hand operated follower rod. It will be evident that this arrangement may be changed, as desired. Two hand operated mechanisms or two motor operated mechanisms of the type illustrated, may be used or the drivers illustrated may be interchanged to meet special requirements. Tests show that an operator of average intelligence can become sufficiently skilled to obtain extremely accurate results after only a very small amount of experience with the machine. Comparative integrations of known functions have been carried out in actual tests within accuracy limits of approximately onetenth of one per cent which, of course, is sufficiently accurate for all ordinary mathematical computations of this character.

The theoretical correctness of the machine of my invention may be readily established by reference to Figure 8 which illustrates diagrammatically the several elements of the machine and the spatial relationship of those elements. In this figure, B represents the axis of rotation of the beam 21; A represents the point of action of the mechanical connection between the slider 23 and the slider rod 129, which rod moves the integrating mechanism 13 rectilinearly along a diameter 183 of the disc 15; N represents the point of action of the mechanical connection between the beam 21 and the right hand follower rod 27; the line 91 represents the base line of the curve supporting table 11 and is, of course, parallel to the direction of rectilinear motion of the table; when both follower rods are positioned so that the spots of light 81 produced by the optical pointers 69 mounted at the ends of the follower rods coincide with this line 91, the wheel 17 of the integrating mechanism 13 will contact the disc 15 at the exact center thereof; the line 185 is parallel to the line 91 and passes through the point B, the center of rotation of the beam 21; the lines AM and NC are perpendicular to the lines 91 and 185. The arrangement whereby motion of the left hand follower rod 25 is transmitted to the slider 23 so that the distance BA is at all times equal to the distance $a'$ has been omitted from Figure 8 in the interests of simplification.

The left hand curve $F_1$ represents a plot of any function of $x$ between the limits $x=a$ and $x=b$; $a'$ is any intermediate ordinate. The right hand curve $F_2$ represents a plot of any other function of $x$ between the same limits and to the same scale; $b'$ is any intermediate ordinate. The base lines of the two curves $F_1$ and $F_2$ coincide with the base line 91 of the machine. The left hand edges of the two curves are parallel and are separated a distance exactly equal to the distance separating the optical pointers 69 attached to the follower rods 25 and 27. This arrangement assures correct positioning of both curves throughout the integrating operation.

As stated previously, the type of problem which the machine is designed to solve is the evaluation of the integral $$\int_a^b F_1 F_2 dx$$

This means that the machine must determine the area under the product curve of $F_1 F_2$ between the limits $x=a$ and $x=b$.

The first step in the mechanical integration of the above integral is the multiplication of the functions $F_1$ and $F_2$, although in the actual operation of the machine multiplication and integration take place simultaneously. This multiplication is accomplished by the beam 21 and the particular mechanical connections between the beam, the follower rods 25 and 27, and the slider rod 129 which moves the integrating mechanism 13. As may be ascertained by reference to Figure 8 and the foregoing description of that figure, the distance CN is at all times equal to $b'$ which, in the interest of simplicity of exposition, we shall take numerically equal to $F_2$. Likewise, the distance BA is at all times equal to $a'$ or $F_1$, and the distance MA is at all times equal to the distance R from the center of the disc 15 to the point of contact between that disc and the integrating wheel 17 of the integrating mechanism 13. Hence, since triangle BAM is geometrically similar to triangle BNC $$\frac{CN}{BN} = \frac{MA}{BA}$$

but $CN = F_2$ and $BA = F_1$
therefore $$\frac{F_2}{BN} = \frac{MA}{F_1}$$

or $$MA = \left(\frac{1}{BN}\right) F_1 F_2$$

Then since $MA = R$ and $BN = L$,
L being an adjustable constant of the machine $$R = \frac{1}{L} F_1 F_2$$

where R is the effective radius of the disc 15 operating to rotate the integrating wheel 17 at any particular instant during the traversing of the table 11 from one side to the other.

Due to direct mechanical coupling between the disc 15 and the table 11, when the table is moved rectilinearly a distance $dx$ the disc is rotated through an angle $d\theta = kdx$ where $k$ is a constant of the machine. And the integrating wheel 17 of radius $r$ will be rotated through an angle $$d\theta' = \left(\frac{k}{r}\right) R dx$$

Hence during a complete integrating operation the angle $\theta'$ (in radians) turned by the integrating wheel 17 will equal $$\frac{k}{r} \int_{x=a}^{x=b} R dx$$

but $$R = \frac{1}{L} F_1 F_2$$

so $$\theta' = \frac{k}{r} \frac{1}{L} \int_a^b F_1 F_2 dx$$

or $$\int_a^b F_1 F_2 dx = \frac{Lr}{k} \theta'$$

And if the integrating wheel 17 turns through $n$ revolutions, since one revolution $= 2\pi$ radians, $$\theta' = 2\pi n$$

or $$\int_a^b F_1 F_2 dx = \frac{2\pi L r}{k} n$$

wherein L, r, and k are constants of the machine. The value of $n$ is read from the counter wheels 177 and 179, and the result of the integration is thereby obtained.

For simplicity of exposition the foregoing theory was carried out for unity scale factors, that is, the quantities $x$, $F_1$ and $F_2$ were taken numerically equal to the corresponding distances on the charts. In general it is more suitable to write $x=mx'$, $F_1=na'$ and $F_2=pb'$, where $x'$ is actual linear distance corresponding to the abscissa $x$, $m$ is the number of units of $x$ represented by the distance $x'$ and $n$ and $p$ are likewise scale factors relating respectively the ordinate $F_1$ with $a'$ and the ordinate $F_2$ with $b'$. Taking these scale factors into consideration, it is easily seen that the result of the integration performed by the machine is $$\int_a^b F_1 F_2 dx = \frac{2\pi L r m n p}{k} n$$

In a specialized routine use of the machine of my invention, the quantities L, r, m, n, p and k may be assigned such numerical values that $n$ or a simple multiple or fraction thereof will be the numerical value of the result of the integration.

From the foregoing it will be seen that the integrating machine of my invention constitutes a simple, foolproof mechanism for effecting the integration of integrals of the general type $\int F_1 F_2 dx$ where $F_1$ and $F_2$ are any finite functions of $x$. The most important novelty of the invention is believed to reside in the various mechanical arrangements which cooperate to produce the desired result. In this connection it should be noted that while I have disclosed a flexible metallic tape as constituting a part of certain of these connections, a flexible wire or cable or similar arrangement can probably be used with good success, and when the term "tape" is used herein it is intended to include such wires, cables, or other arrangements.

While the apparatus disclosed is designed primarily for accomplishing the integration of integrals of the above type where $F_1$ and $F_2$ have only positive values, it will be immediately apparent to anyone skilled in the art that the machine may be used for carrying out integrations wherein one or both of the functions $F_1$ and $F_2$ may have negative values. To do this, it is merely necessary to further lengthen the support for the slider 23 a sufficient amount to permit the slider 23 to be moved to either side of the axis of rotation B of the beam 21 and to similarly proportion the mechanical connection between the slider 23 and the slider rod 129. When working with integrals of functions having negative values, the integrating wheel 17 may, of course, be carried to the other side of the center point of the disc 15 during the integrating operation. These changes are so obvious and so minor that it is thought that an illustration of them would merely complicate the disclosure and in no way add to the completeness of the description of the invention.

It will likewise be evident to those skilled in the art that various mechanical arrangements may be worked out for effecting the means which have been disclosed herein. Accordingly, it is my intention that the accompanying claims shall be accorded the broadest reasonable construction consistent with the language appearing therein and the prior art.

I claim the following as my invention:

1. In a mechanical integrating machine of the class described; a chart table arranged for rectilinear movement; a rotatable disc; means mechanically connecting said disc to said table whereby movement of said disc produces corresponding movement of said table; an integrating mechanism having a single integrating wheel arranged to slide on said disc along a predetermined path; means for controlling the movement of said integrating wheel on said disc, said last mentioned means including a rotatable beam, a member supported on said beam so as to be movable longitudinally thereof, a pair of independently movable follower members each of which is provided with a pointer mechanism for facilitating the following of the outline of curves plotted upon charts supported upon said table, means mechanically connecting one of said follower members to said beam whereby movement of said follower member causes rotation of said beam, and means mechanically connecting the other of said follower members to the member supported on said beam whereby movement of that follower member causes movement of said member supported on said beam.

2. In a mechanical integrating machine of the class described; a table for supporting and carrying charts of the curves to be integrated; means supporting said table for rectilinear movement; a flat surfaced, rotatable disc; means mechanically connecting said disc to said table whereby movement of said disk produces corresponding movement of said table; an integrating mechanism having a single integrating wheel for slidably engaging the flat surface of said disc; support means for said integrating mechanism comprising a slidable member arranged so that said single integrating wheel contacts said disc along a diameter thereof; and means for controlling the movement of said slidable member including a beam supported for rotation about a central axis extending at right angles to the longitudinal axis of said beam, a slider supported on said beam so as to be movable longitudinally thereof, a pair of follower members supported for rectilinear movement independently of each other, means mechanically connecting one of said follower members to said beam whereby movement of said follower member causes rotation of said beam, and means mechanically connecting the other of said follower members to said slider supported on said beam whereby movement of that follower member causes corresponding movement of said member supported on said beam.

3. In a mechanical integrating machine of the class described; a chart table arranged for rectilinear movement; a rotatable disc; means mechanically connecting said disc to said chart table whereby movement of said disk produces corresponding movement of said table; an integrating mechanism having a single integrating wheel arranged to slide on said disc; support means for said integrating mechanism including a longitudinally movable rod member; means for controlling the movement of said integrating wheel including a rotatable beam, a member supported on said beam so as to be movable longitudinally thereof, a mechanical connection between said last mentioned member and said longitudinally movable rod member, a pair of follower rods supported so as to be longitudinally movable independently of each other, a pointer mechanism for facilitating the following of the outline of the curves plotted upon charts supported upon said table affixed to one end of each of said follower rods, means mechanically connecting one of said follower rods to said beam whereby movement of said follower rod causes rotation of said beam, means mechanically connecting the other of said follower rods to the member movably supported on said beam whereby movement of that follower rod causes movement of said member supported on said beam, and means for preventing axial rotation of said support rod and said follower rods during the operation of said apparatus.

4. Apparatus as in claim 3 wherein the means for preventing axial rotation of said support rod and said follower rods comprises, individually, an elongated guide member rigidly attached to one of said rods so as to extend generally at right angles to the longitudinal axis thereof, and means for defining a guide slot within which the outer end of said guide member is arranged to move.

5. In a mechanical integrating machine of the class described, a flat topped table for supporting and carrying charts of the curves to be integrated, means supporting said table for rectilinear movement between two extreme positions, a disc supported for rotation about the central axis thereof, a mechanical connection of adjustable ratio intermediate said table and said disc whereby movement of said disc causes movement of said table, and means including a spring which biases said table to one of said extreme positions for eliminating any play in said connection.

6. In a mechanical integrating machine of the class described, a chart table supported for rectilinear movement between two extreme positions, a disc supported for rotation about the central axis thereof, a mechanical connection intermediate said disc and said table member including interchangeable gears and a flexible tape or wire whereby movement of said disc causes movement of said table, and spring means which biases said table to one of said extreme positions for eliminating play in said connection.

7. In a mechanical integrating machine of the class described; a chart table arranged for rectilinear movement; a rotatable disc; a mechanical connection of adjustable ratio operatively interconnecting said table and said disc; spring means for eliminating any play in said mechanical connection of adjustable ratio; an integrating mechanism having a single integrating wheel arranged to slide on said disc along a predetermined path; means for controlling the movement of said integrating wheel on said disc, said last mentioned means including a rotatable beam, a member supported on said beam so as to be movable longitudinally thereof, a pair of independently movable follower members each of which is provided with a pointer mechanism for facilitating the following of the outline of curves plotted upon charts supported upon said table, means mechanically connecting one of said follower members to said beam whereby movement of said follower member causes rotation of said beam, and means mechanically connecting the other of said follower members to the member supported on said beam whereby movement of that follower member causes movement of said member supported on said beam.

8. In a mechanical integrating machine of the class described; a table for supporting and carrying charts of the curves to be integrated; means supporting said table for rectilinear movement between two extreme positions; a flat surfaced, rotatable disc; a mechanical connection operatively interconnecting said table and said disc including interchangeable gears and a flexible tape or wire whereby movement of said disc causes movement of said table; spring means which biases said table toward one of said extreme positions for eliminating play in said mechanical connection; an integrating mechanism having a single integrating wheel for slidably engaging the flat surface of said disc; support means for said integrating mechanism comprising a slidable member arranged so that said single integrating wheel contacts said disc along a diameter thereof; and means for controlling the movement of said slidable member including a beam supported for rotation about a central axis extending at right angles to the longitudinal axis of said beam, a slider supported on said beam so as to be movable longitudinally thereof, a pair of follower members supported for rectilinear movement independently of each other, means mechanically connecting one of said follower members to said beam whereby movement of said follower member causes rotation of said beam, and means mechanically connecting the other of said follower members to the member supported on said beam whereby movement of that follower member causes corresponding movement of said member supported on said beam.

9. In a mechanical integrating machine of the class described; a chart table arranged for rectilinear movement; a rotatable disc; means mechanically connecting said disc to said table whereby movement of said disc produces corresponding movement of said table; an integrating mechanism having a single integrating wheel arranged to slide on said disc along a predetermined path; means for controlling the movement of said integrating wheel on said disc, said last mentioned means including a rotatable beam, a member supported on said beam so as to be movable longitudinally thereof, a pair of independently movable follower members each of which is provided with a pointer mechanism for facilitating the following of the outline of curves plotted upon charts supported upon said table, means mechanically connecting one of said follower members to said beam whereby movement of this follower member causes rotation of said beam, and means mechanically connecting the second of said follower members to said member longitudinally movable on said beam whereby said movable member will be moved in response to movement of said second follower member regardless of the position of said beam during the operation of said machine; said last mentioned mechanical connecting means including a flexible tape and guide means therefor, said flexible tape being mechanically connected at one end to said second follower member and at the other end to said movable beam-supported member and having a twistable portion located so as to coincide with the axis of rotation of said beam.

10. In a mechanical integrating machine of the class described; a table for supporting and carrying charts of the curves to be integrated; means supporting said table for rectilinear movement; a flat surfaced, rotatable disc; means mechanically connecting said disc to said table whereby movement of said disc produces corresponding movement of said table; an integrating mechanism having a single integrating wheel for slidably engaging the flat surface of said disc; support means for said integrating mechanism comprising a slidable member arranged so that said single integrating wheel contacts said disc along a diameter thereof; and means for controlling the movement of said slidable member including a beam supported for rotation about a central axis extending at right angles to the longitudinal axis of said beam, a slider supported on said beam so as to be movable longitudinally thereof, a pair of follower members supported for rectilinear movement independently of each other, means mechanically connnecting one of said follower members to said beam whereby movement of said follower member causes rotation of said beam, and means connecting the second of said follower members to said slider whereby said slider will be moved in response to movement of said second follower regardless of the position of said beam during the operation of said machine; said last mentioned mechanical connecting means including a flexible tape and guide pulleys, said flexible tape being mechanically connected at one end to said second follower member and at the other end to said slider member, and said guide pulleys being so arranged that a portion of said tape is located so as to coincide with the axis of rotation of said beam.

JOHANNES A. VAN DEN AKKER.